United States Patent [19]

Nishio et al.

[11] 3,857,010

[45] Dec. 24, 1974

[54] METHOD FOR WELDING MULTI-LAYER LAMINATED WORK PIECES

[75] Inventors: Yasuhiro Nishio; Yoshiriro Yamamoto; Zenichiro Okamoto; Nagio Minami; Masazumi Nagareda, all of Hiroshima, Japan

[73] Assignee: Mitsubishi Jukogyo Kabushiki Kaisha, Tokyo, Japan

[22] Filed: Mar. 27, 1973

[21] Appl. No.: 345,306

[52] U.S. Cl............... 219/61, 29/497, 219/137, 285/286
[51] Int. Cl............................................ B23k 31/06
[58] Field of Search ............. 29/471.1, 497; 219/61, 219/137; 285/286

[56] References Cited
UNITED STATES PATENTS

| | | | |
|---|---|---|---|
| 2,233,455 | 3/1941 | Larson | 219/137 X |
| 2,928,932 | 3/1960 | Huggins et al. | 219/137 |
| 2,943,387 | 7/1960 | Dawson | 29/471.1 |
| 3,248,134 | 4/1966 | Pennington | 29/471.1 X |
| 3,431,630 | 3/1969 | Sagara et al. | 29/497 X |
| 3,497,101 | 2/1970 | Sagara et al. | 29/471.1 X |
| 3,634,650 | 1/1972 | Nomuro | 219/137 |
| 3,680,584 | 8/1972 | Pierart | 29/471.1 X |
| R22,251 | 1/1943 | Stresau | 29/471.1 X |

Primary Examiner—Andrew R. Juhasz
Assistant Examiner—Ronald J. Shore
Attorney, Agent, or Firm—McGlew and Tuttle

[57] ABSTRACT

Multi-layer laminated metal work pieces, such as barrels or cylinders, are butt-welded in end-to-end relation by multi-pass deposition of molten weld metal from a metal welding rod. The successive passes are performed by moving the welding rod along a line extending at an acute angle to the contacting surfaces of adjacent layers of the work pieces, to form a series of superposed welding beads extending at such acute angle to the contacting surfaces.

5 Claims, 11 Drawing Figures

METHOD FOR WELDING MULTI-LAYER LAMINATED WORK PIECES

FIELD AND BACKGROUND OF THE INVENTION

This invention relates to a process for welding laminated barrels with a saving of cost through omission of the usual procedure of padding their beveled ends.

Conventional processes of uniting barrels of this type consisting of multiple layers of hoops by direct butt welding often invite defects such as overhanging of the hoop layers or formation of cavities like undercuts between those layers due to contraction of the weld metal. An attempt at avoiding such defects by padding the beveled ends beforehand is impractical for cost reasons.

SUMMARY OF THE INVENTION

The present invention has for its object the provision of a process for welding laminated barrels without involving any of the foregoing defects.

The invention is thus characterized in that, in butt welding of a laminated barrel with another laminated barrel or single-walled barrel, the individual layers are welded with deposited metal along lines at a suitable angle to the lines of contact between the component layers. The present invention is economically advantageous because direct layer-to-layer welding is possible without the need of padding beveled ends in advance.

BRIEF DESCRIPTION OF THE DRAWINGS

Other features and advantages of this invention will be apparent from the following description taken in conjunction with the accompanying drawings showing an embodiment thereof as compared with a conventional process also illustrated therein. In the drawings.

DESCRIPTION OF THE PREFERRED EMBODIMENTS

Figure 1:
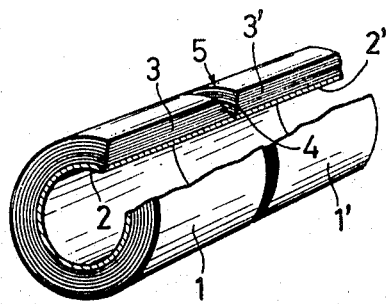
FIG. 1 is a perspective view of laminated barrels being conventionally joined together by circumferential butt welding.

First, a conventional process will be explained with reference to FIGS. 1 to 4. As shown in FIG. 1, laminated barrels 1, 1' are made respectively of inner cylinders 2, 2' and plates 3, 3' coiled into a plurality of layers around the inner cylinders. The ends of the two laminated barrels 1, 1' to be butt welded are beveled as at 4. The two barrels are rotated together by suitable drives, not shown, and are welded together at a point 5, indicated by an arrow, by means of a welding equipment, not shown. This process involves the disadvantages now to be explained.

Figure 2A:
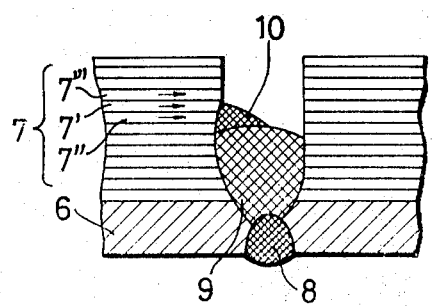
FIGS. 2(a) and 2(b) are sectional views of beveled ends for welding of the barrels of FIG. 1.
Figure 2B:
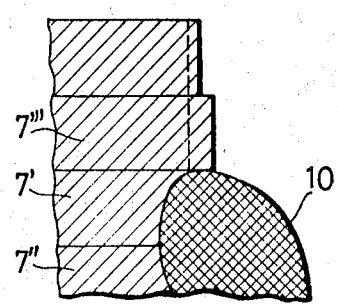

1. In FIGS. 2(a) and (b), which are sections of beveled ends for welding, there are shown an inner cylinder 6, a plate 7 coiled to form a plurality of layers over the inner cylinder, deposited metal 8 formed by welding from the inner wall of the inner cylinder, and deposited metal 9 being formed in the course of welding by the procedure illustrated in FIG. 1. When an additional bead 10 has been formed on the deposited metal 9 as shown in FIG. 2(a), the layers 7' and 7", which are originally not welded to each other nor to the overlying layer 7''' but have just been welded by the metal 9, are subjected to most of the contractive power of the deposited metal 9 on cooling and are forced in the same direction indicated by arrows. As a result, the layer 7''' immediately above the layer 7', and to lesser extents those overlying the layer 7''' too, are urged in the same direction because of the contact resistance due to the coiling force exerted, until, as shown to a larger scale in FIG. 2(b), the layer 7''' and higher layers overhang stepwise from their initial end positions indicated by a dash line. This phenomenon, of course, occurs with each bead formed on the deposited metal 9 already made by welding. Consequently, the amount of shrinkage of the already welded portions and the reduction in the bevel gap of the portions to be welded are extremely large as compared with those in the welding of single-walled barrels.

Figure 3A:
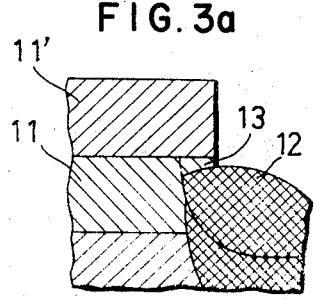
FIGS. 3(a), 3(b) and 3(c) are sectional views explanatory of the individual layers on one side of FIG. 2(a) and beads formed by welding.
Figure 3B:
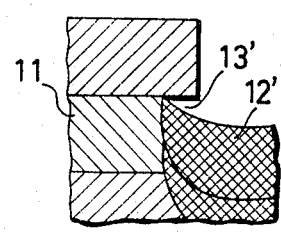
Figure 3C:
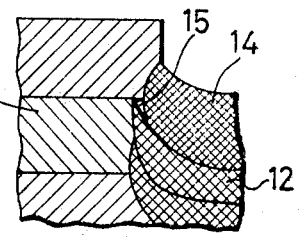

2. FIGS. 3(a) to (c) show sections of beveled ends of layers and beads formed by welding: 3(a) immediately after the deposition of a bead; 3(b) when the bead has solidified some time after the deposition; and 3(c) when a next bead deposited has become solid. In FIG. 3(a), the molten metal immediately after welding takes the form 12. At this point the end 13 of the layer 11 is either simply in contact with, or slightly spaced apart from, the immediately overlying layer 11', and it therefore is a poor thermal conductor and is melted by the radiant heat of the molten metal 12. The result is that, when the molten metal 12, has solidified to be deposited metal 12' as shown in FIG. 3(b), a recess 13' is formed. If the ensuing bead 14 deposited for the next layer fails to effect adequate penetration into the layer 11, a cavity 15 (FIG. 3c) will be left behind as a defect like an undercut extended along in the direction of the weld line. The larger the heat quantity retained by the molten metal (or the weld heat input) or the less the thickness of the plate forming the individual layers or the larger the gaps between the layers, the more frequently the aforesaid defect can result. This tendency also varies with the position where molten metal is placed. For example, if the upper surface of molten metal is lower than the center of thickness of the layer 11 in FIG. 3(a), the end 13 will have a sufficiently large thermal capacity to remain unmelted and the deposited metal will take the form like that of the metal 14 in FIG. 3(c), the subsequent beads no longer creating the cavity defect.

Figure 4:
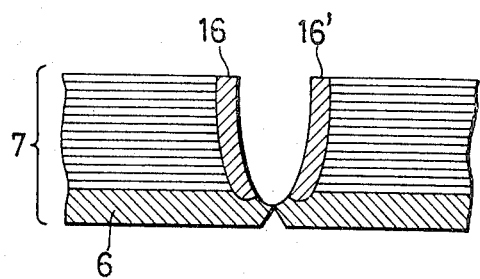
FIG. 4 is a sectional view of beveled ends padded in a conventional way.

In an attempt at eliminating the foregoing disadvantages of direct butt welding of laminated barrels, it has been proposed and practiced to pad the beveled ends as at 16, 16' in FIG. 4 and then carry out butt welding of the two laminates in the same manner as with two single-walled plates. (Refer, for example, to the published specification of Japanese Patent Publication No. 19430/1963.) However, the necessity of padding the beveled faces is a great economic disadvantage.

Figure 5:
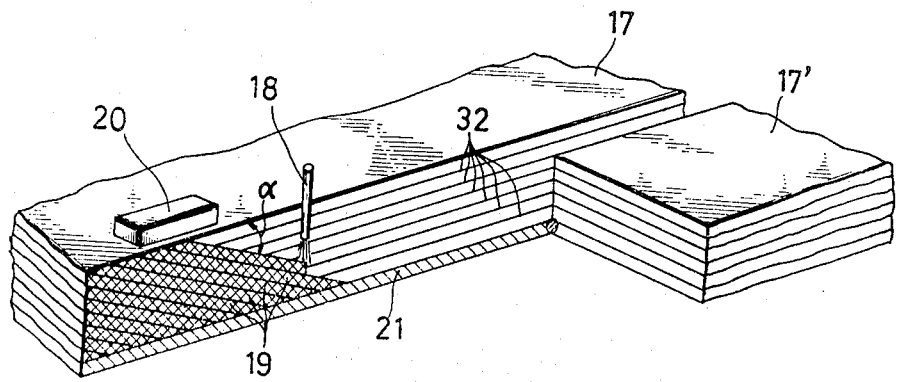
FIG. 5 is a perspective view of laminates being butt welded in accordance with this invention.
Figure 6A:
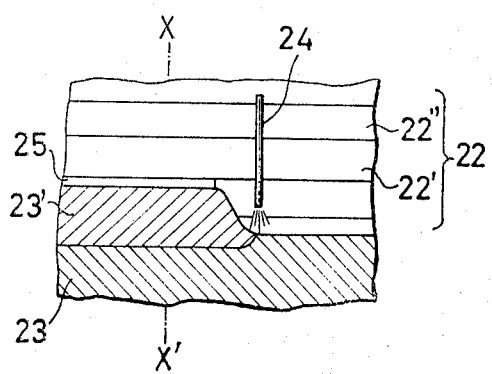
FIGS. 6(a) and 6(b) are sectional views parallel to beveled faces of laminates according to the conventional process and this invention, respectively, illustrating the lamination of deposited metal and development of defects.
Figure 6B:
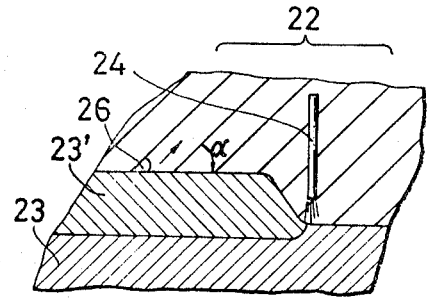

The present invention provides a welding process for obtaining sound welds in the welding of laminated barrels without the necessity of padding the beveled faces in advance and without involving any of the difficulties described above. The process of the invention will be described in detail hereunder with reference to FIGS. 5 to 7. As shown in FIG. 5 which illustrates butt welding of laminated structures, two laminated plates 17, 17', each consisting of a plurality of layers, are welded together with a welding wire 18 fed by a suitable welding equipment, not shown, in such a manner that the weld line or the direction of each deposited metal layer makes an angle $\alpha$ to the line 32 of contact between the layers of the laminate. Such layers of deposited metal are indicated at 19. Numeral 20 denotes a cooling strip for avoiding the flow of molten metal out of the gap adjacent the ends of metal layers and for correcting the shape of the molten metal along the layer ends. (When shield gas is used in the process method, the gas may be allowed to jet out through this strip). Deposited metal for backing use that is welded to the lowermost layer of each laminate is indicated at 21. In place of this backing deposited metal, a cooling strip similar to the strip 20 may be employed.

In FIG. 5, the lowest limit value of the angle $\alpha$ that does not lead to the defects as in the conventional processes is dictated by the procedure and conditions of welding, thickness of the component layers, and other factors. Experiments indicated that the minimum values of the angle $\alpha$ for the given sets of test conditions were as follows:

1. Butt welding was performed by a procedure in which two laminates, each of which consisted of 20 thicknesses of plate (4.3 mm in thickness) were held end to end with a bevel gap of 13 mm and the parts being welded were shielded with a gaseous mixture of 50 percent Ar + 50 percent $CO_2$. The welding conditions were: welding wire, 3.2 mm in diameter; welding current, 500 A; welding voltage, 40 V; and welding rate, 40 cm/min. Under these conditions the welding of several layers was carried out continuously with one pass per layer. The minimum value of the angle $\alpha$ in this case was 20°.

2. Welding was peformed with the same laminates and the same welding procedure under the same welding conditions as used in Example (1) above, but with interruption. The several layers were welded not continuously but with a 10-second rest after the welding of each layer. The minimum value of the angle $\alpha$ was 15°.

3. Using the same laminates and procedure as in Example (1), several layers were continuously welded with one pass per layer under the following conditions. The bevel gap was 10 mm, the welding wire was 24 mm in diameter, the welding current was 400 A, the welding voltage was 35 V, and the welding rate was 35 cm/min. The minimum value of the angle $\alpha$ was 15°.

4. The procedure of Example (3) above was repeated under the same conditions excepting that the welding was carried out not continuously but with a 10-second rest after the welding of each layer. The minimum value of the angle $\alpha$ was 10°.

As stated above, the welding operation with the use of the angle $\alpha$ precludes the difficulties usually involved in the conventional processes as already noted. This may be ascribed to the following facts:

1. The welding along the lines at the angle $\alpha$ enables all of the component layers to be welded, as shown in FIG. 5, per pass of welding, and the amount of contraction of the weld is accordingly limited. In addition, no overhang of the layers at the unwelded bevel ends as in FIG. 2(b) will result.

2. The defect like an undercut, shown in FIG. 3, cannot be produced. This may be explained below in connection with FIGS. 6(a) and (b), which illustrate a conventional process and the process of the invention, respectively. Throughout both figures reference numeral 22 indicates component layers, 23 an existing deposited metal layer, and 23' a metal layer being deposited by a welding wire 24. In the ordinary process shown in FIG. 6(a), a portion 25 of a layer 22 is in contact with the overlying layer 22' but its thermal conductivity is low because of the presence of a gap between the two layers. Consequently, the portion is easily melted away by the heat of welding, so that the section taken along the line X—X' in this figure is changed to a state as shown in FIG. 3(b), and the welding of the next layer leaves behind a cavity like an undercut. In the process of the invention illustrated in FIG. 6(b), the front end portion (e.g., the portion indicated at 26) of each layer 22 that contacts the deposited metal 23' at a suitable angle $\alpha$ thereto is heated by the welding heat. However, because the heat is readily transferred in the direction indicated by an arrow, that portion remains unmelted and produces no undercutlike defect.

Figure 7:
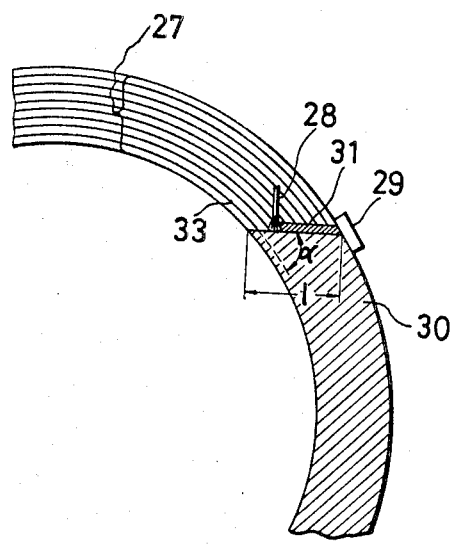
FIG. 7 is a fragmentary sectional view of a cylindrical laminated barrel being circumferentially welded by the process of the invention.

Next, the process of the invention will be described as applied to the circumferential welding of cylindrical laminated barrels with reference to FIG. 7, which shows a part of such a barrel in a section parallel to its beveled face. There are shown a plurality of layers 27 constituting the barrel, a welding wire 28 being fed from a welding machine (not shown), a cooling strip 29, a mass of metal 30 already deposited, and a metal layer 31 being deposited with the progress of welding. In this example, the welding is performed in the position where the angle that the laminating contact line 33 of the innermost layer makes to the deposited metal layer 31 is $\alpha$, or a suitable angle that precludes the disadvantages of the conventional process. In this state all of the angles that the laminating contact lines of all other layers make to the corresponding deposited metal layers are not less than $\alpha$ at all times and, for the same reason as above explained, all of the positions eliminates the chance of producing any defect.

In the example just described above as well as in the welding of flat laminated structures shown in FIG. 5, it is desirable to minimize the angle $\alpha$ within the limits that do not lead to any defect, for the following reasons.

The smaller the angle $\alpha$, the greater the well length per pass (indicated by a dimension $l$ in FIG. 7) will be. This is beneficial for the efficiency of submerged arc welding, for example, where the frequency of slag removal can be reduced accordingly. In the case of the welding technique that uses shield gas and requires no slag removal, continuous welding with runs back and forth is possible. However, if the weld length per pass is short, each weld is not allowed to solidify well before the next run, and the weld heat input for each pass has to be increased by that much for the ensuing pass, with the result that the work is welded as if with a large heat input. This coarsens the grain size of the weld and adversely affects the toughness of the welded structure. Here again it is desirable to reduce the angle $\alpha$ and increase the weld length per pass.

What is claimed is:

1. A method of butt-welding multi-layer laminated metal work pieces in end-to-end relation by multi-pass deposition of molten weld metal between facing ends of the laminated work pieces to weld-unite the same, comprising the steps of, during each pass, depositing molten metal, between the facing ends, from a metal welding rod; performing successive passes by moving the welding rod along a line extending at an acute angle to the contacting surfaces of adjacent layers of the work pieces to form a series of superposed welding beads extending at such acute angle to the contacting surfaces.

2. A method of butt-welding multi-layer laminated metal work pieces as claimed in claim 1, in which said work pieces are multi-layer laminated metal cylinders.

3. A method of butt-welding multi-layer laminated metal work pieces, as claimed in claim 1, in which the welding is effected by an electric arc welding process.

4. A method of butt-welding multi-layer laminated metal work pieces, as claimed in claim 1, in which said acute angle has the least possible magnitude in excess of a range producing defects in the weld.

5. A method of butt-welding multi-layer laminated metal work pieces, as claimed in claim 4, in which said acute angle has a magnitude not less than 10°.

* * * * *